No. 634,663. Patented Oct. 10, 1899.
J. H. GARDNER.
THRESHING MACHINE.
(Application filed Dec. 12, 1898.)
(No Model.) 2 Sheets—Sheet 1.
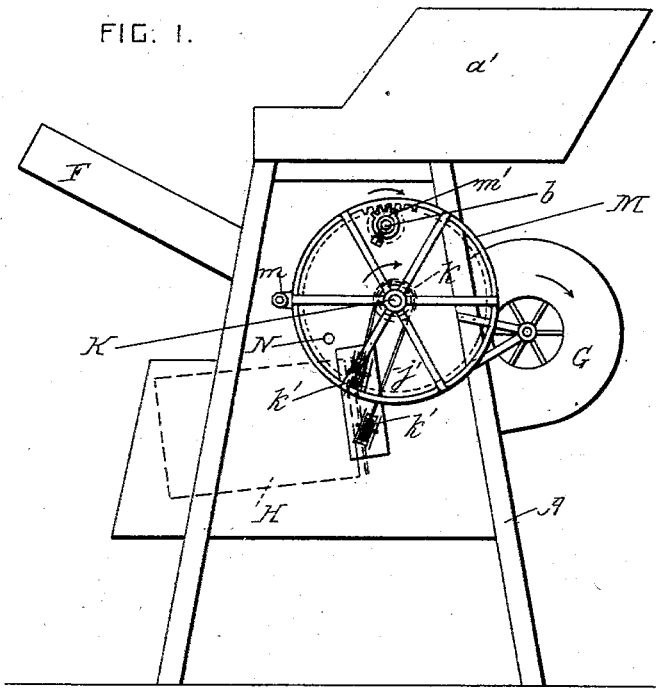
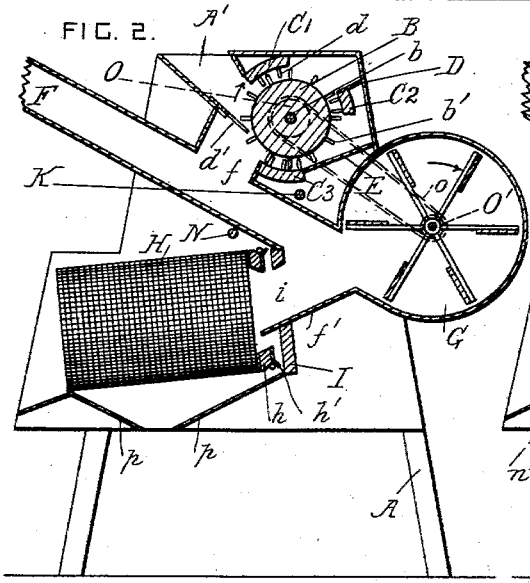 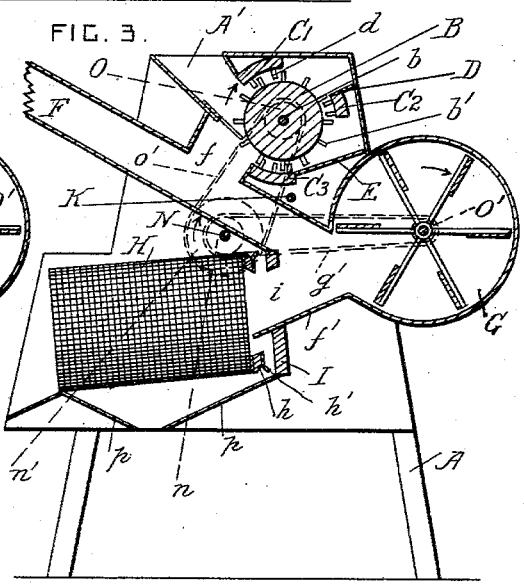
WITNESSES
Robert Quinn
Bertha L. Dana
INVENTOR
John H. Gardner.
by Herbert W. T. Jenner.
Attorney No. 634,663.

Patented Oct. 10, 1899.

J. H. GARDNER.
THRESHING MACHINE.
(Application filed Dec. 12, 1898.)

(No Model.)

2 Sheets—Sheet 2.

WITNESSES
Robert Gunn
Bertha L. Dana

INVENTOR
John H. Gardner
by Herbert W. Jenner.
Attorney

UNITED STATES PATENT OFFICE.

JOHN H. GARDNER, OF DALTON, GEORGIA.

THRESHING-MACHINE.

SPECIFICATION forming part of Letters Patent No. 634,663, dated October 10, 1899.

Application filed December 12, 1898. Serial No. 699,047. (No model.)

*To all whom it may concern:*

Be it known that I, JOHN H. GARDNER, a citizen of the United States, residing at Dalton, in the county of Whitfield and State of Georgia, have invented certain new and useful Improvements in Threshing-Machines; and I do hereby declare the following to be a full, clear, and exact description of the invention, such as will enable others skilled in the art to which it appertains to make and use the same.

This invention relates to threshing-machines, and more particularly to machines used for threshing peas and beans and for separating the seeds from the pods.

This invention consists in the novel construction and combination of the parts hereinafter fully described and claimed.

Figure 4:
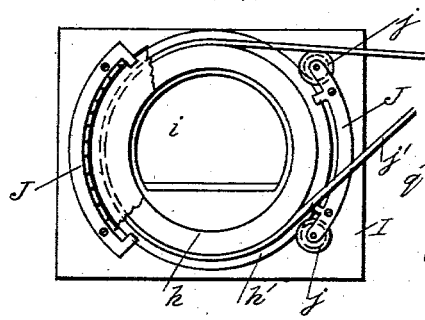
Figure 5:
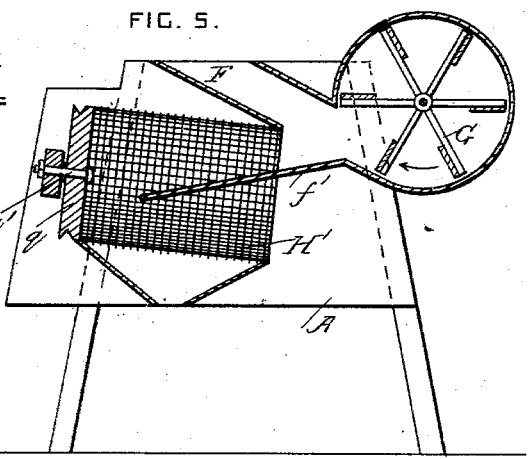
Figure 6:
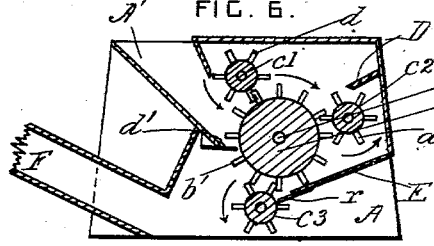
Figure 7:
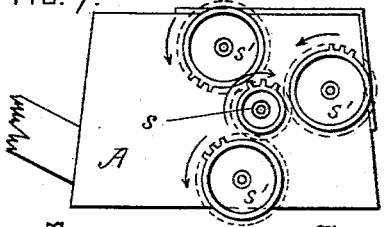
Figure 8:
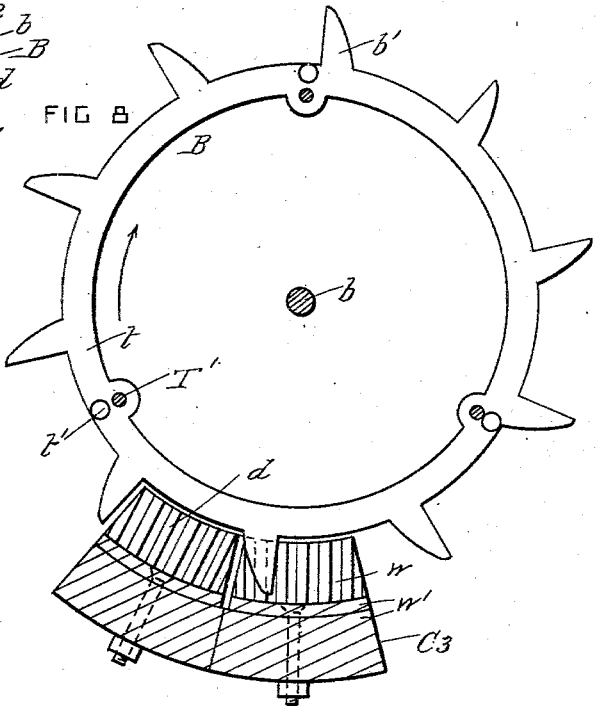
Figure 9:
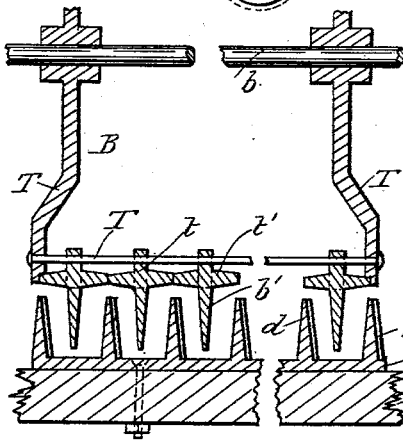
Figure 10:

In the drawings, Figure 1 is a side view of the machine. Fig. 2 is a longitudinal section through the machine with the feed-hopper removed, showing it arranged for threshing peas. Fig. 3 is a similar longitudinal section showing the machine arranged for threshing beans. Fig. 4 is a detail end view of the support for the screen to revolve in. Fig. 5 is a longitudinal section showing a modification in the arrangement of the screen. Fig. 6 is a longitudinal section showing a modification of the threshing mechanism. Fig. 7 is a side view showing one means for revolving the threshing mechanism shown in Fig. 6. Fig. 8 is a detail section through the threshing mechanism, drawn to a larger scale. Fig. 9 is a section through the axis of the threshing-cylinder. Fig. 10 is a detail view of some of the teeth of the concave.

A is the frame of the machine, which is of any approved construction, and $a'$ is the feed-hopper at the top of the frame.

$A'$ is the chute through which the pods and straw pass from the hopper to the threshing mechanism.

B is the threshing-cylinder, $b$ is its shaft, and $b'$ are the teeth which project from the periphery of the said cylinder.

$C'$, $C^2$, and $C^3$ are three sections of the concave, provided with teeth $d$.

The cylinder and its concave may be of any approved construction; but they are preferably made as hereinafter more fully described.

The arrows in the drawings indicate the direction of motion of the various parts adjacent to them.

The threshing-cylinder B is arranged in front of the chute $A'$, and $d'$ is a toothed or serrated guard at the bottom of the said chute, which prevents the pods and straw from dropping past the cylinder. The section $C'$ of the concave is arranged in front of the chute above the rear half of the cylinder, and D is an inclined feed-board arranged above and in front of the cylinder. The section $C^2$ of the concave is arranged below the feed-board D in front of the cylinder. A second inclined feed-board E is arranged below the section $C^2$ in front of and below the cylinder, and the section $C^3$ of the concave is arranged to the rear of the feed-board E below the rear half of the cylinder.

The pods are threshed in passing the section $C'$ and are thrown onto the feed-board D. The pods slide off the feed-board D and are again threshed as they pass the section $C^2$ before falling on the feed-board E. The pods slide off the board E and are threshed for a third time as they pass the section $C^3$.

If desired, a single section of the concave can be used or any two sections, and with some material to be threshed a good arrangement is to remove the middle section $C^2$ and use only the remaining sections.

When the inclined feed-boards D and E are used in combination with three concave-sections, they form two inclosed chambers in the casing, and the material is brought to rest in these chambers twice in its passage through the threshing mechanism and is therefore threshed three times over. Threshing is accomplished by impact, the seeds being knocked out by the rapidly-moving teeth of the cylinder striking the material as it slides very slowly from the chute and the feed-boards into contact with the cylinder-teeth. When a series of concave-sections is used and the material is not brought to rest upon feed-boards in inclosed chambers interposed between the concave-sections, the said concave-sections have only the effect of a single very broad concave-section. Nearly all the threshing action takes place at the first concave-section, the effect of the subsequent sections upon the material traveling at the peripheral speed of the cylinder being merely to tear up the material into shreds, and very little threshing action taking place.

F is an upwardly and rearwardly inclined straw spout or trough for receiving the threshed material from the threshing mechanism, and G is a fan or blower of any approved construction arranged at the front part of the machine. This fan forces a current of air up the straw-spout and drives all the light portions of the threshed material out of the rear of the machine. The seeds and heavy portions of the threshed material, such as broken pods, pass through an opening $f$ at the lower part of the straw-spout F and slide down a chute $f'$ into the screen H.

The screen H is preferably a perforated cylinder, which is arranged in an inclined position and is revolved upon its axis. The cylinder H is preferably formed of wirework and is supported and revolved in any approved manner. It is found that a rotary cylindrical screen is the only device which will separate the Southern field-pea in a satisfactory manner without choking.

I is a transverse plate for supporting the screen. This plate is secured to the frame of the machine and is provided with an opening $i$ for the seeds to pass through. The screen has an annular head $h$ at one end, and $h'$ is a flanged ring secured to the said head. J are brackets secured to the plate I and engaging with the flanged ring $h'$. Antifriction-rollers $j$ are provided and are arranged between one of the brackets J and the ring, so as to permit the screen to revolve freely. The flanged ring and the head form a V-shaped groove, and $j'$ is a cord or belt which engages with the said groove and drives the screen.

K is the driving-shaft of the machine, and $k$ is a grooved pulley secured on it. The cord or belt $j'$ passes over the pulley $k$ and over guide-pulleys $k'$, supported by the frame, as shown in Fig. 1.

M is a toothed wheel secured on the shaft K and provided with any approved means for revolving it. The wheel M is preferably an internal toothed wheel provided with an ordinary crank-handle $m$ for revolving it.

N is a counter-shaft arranged parallel with the shafts K and $b$ and passing transversely through the machine under the straw-spout.

When peas are to be threshed, a removable toothed pinion $m'$ is secured on the cylinder-shaft $b$ in gear with the wheel M. A pulley O is secured on the shaft $b$, and a pulley O' is secured on the fan-shaft $g$. A belt $o$ passes over the pulleys O and O' and drives the fan at a speed appropriate to the speed of the cylinder and the material being operated on.

The counter-shaft N is provided with a pulley $n$ of the same diameter as the pulley O and a second pulley $n'$ of twice the diameter of the pulley O.

When beans are to be threshed instead of peas, the cylinder requires to be driven about twice as fast as when peas are to be threshed, but the fan does not require to have its speed increased.

In order that both peas and beans can be threshed and the machine quickly and easily transformed from a pea-thresher to a bean-thresher, the counter-shaft is arranged at the same distance from the driving-shaft as the shaft $b$, and the pinion $m'$ is taken off the shaft $b$ and is secured on the counter-shaft N in gear with the wheel M. The belt $o$ is removed from the pulleys O O'. A belt $o'$ is slipped over the pulleys O and $n'$, and a belt $g'$ is slipped over the pulleys O' and $n$. Sprocket-wheels and drive-chains can be used in place of pulleys and belts, if desired, or any other equivalent driving mechanisms may be used.

When the screen is downwardly and rearwardly inclined, as shown in Fig. 2, the broken pods and other heavy matter pass out of its rear end, and the seeds fall through the meshes of the screen and are collected by the gatherboards $p$, which guide them into a suitable receptacle. If desired, the screen may be inclined in the reverse direction, as shown in Fig. 5. When thus arranged, the chute $f'$ is extended so that it delivers onto the higher end portion of the screen H', and the screen H' has its rear end closed by a head $q$, which is provided with a groove for the driving-cord and is journaled on a pin $q'$, projecting from the frame of the machine.

Instead of using stationary concave-sections, as shown in Fig. 2, revoluble concave-sections $c'$, $c^2$, and $c^3$ may be used, as shown in Fig. 6. The arrangement of the feed-boards is the same, but the feed-board E is provided with a toothed or serrated guard-plate $r$ to prevent material from dropping between it and the revoluble concave-section or cylinder $c^3$.

The revoluble concave-sections are revolved continuously in a reverse direction from the threshing-cylinder and at a slower speed. A toothed pinion $s$ is secured on the cylinder-shaft, and $s'$ are similar toothed wheels secured on the shafts of the said revoluble sections in gear with the pinion $s$. Any other approved driving mechanism may be used in place of the pinion $s$ and the wheels $s'$. The revoluble concave-sections do not wear out as soon as the stationary sections, because there are more teeth in them and the teeth are less liable to become clogged by straw and rubbish when the section is revoluble.

In carrying out this invention all the concave-sections may be stationary or all of them may be revoluble or the stationary and revoluble sections may be combined together in any desired manner, as may be found convenient and desirable.

The threshing-cylinder is preferably formed of a series of rings $t$, provided with distance-pieces $t'$ for holding them apart and having threshing-teeth on their peripheries. The threshing-cylinder is provided with heads T, secured on the shaft $b$, and the rings $t$ are strung upon bars T', which are secured to the heads and extend between them. The threshing-cylinder can be made of any desired length by merely varying the number of rings used in its construction.

The teeth of the threshing-cylinder and of the concave-sections or cylinders may be of any approved form or construction; but the teeth of the concave-sections are preferably ribbed or fluted radially. When thus provided with radial ribs, flutes, or corrugations $w$, the teeth are wider than those ordinarily used and are arranged to project from a base-plate $w'$ in a series. The teeth are attached to the bars or cylinders by bolts or other fastening devices, which pass through holes in the base-plates. The corrugations on the teeth greatly increase the effective surfaces which operate to remove the seeds from the pods, and the ribs or projections on one side of each tooth are arranged opposite the grooves or flutes in its opposite side.

What I claim is—

1. In a threshing-machine, the combination, with a threshing-cylinder, and a feed-chute arranged above and behind the cylinder; of a concave-section arranged over the said cylinder, a concave-section arranged under the said cylinder, and a downwardly and rearwardly inclined feed-board arranged in front of the last said concave-section, and temporarily supporting the material from the first said concave-section clear of the teeth of the threshing-cylinder, substantially as set forth.

2. In a threshing-machine, the combination, with a threshing-cylinder, and a feed-chute arranged above and behind the cylinder; of concave-sections arranged respectively above, in front of, and below the said cylinder; and downwardly and rearwardly inclined feed-boards arranged respectively above the section in front of the cylinder, and in front of the section below the cylinder, said feed-boards operating to temporarily support the material clear of the teeth of the threshing-cylinder, substantially as set forth.

3. In a threshing-machine, the combination, with a threshing-cylinder, and a feed-chute arranged above and behind the cylinder; of revoluble concave-sections arranged around the said cylinder, driving mechanism operating to revolve the said sections continuously, and a downwardly and rearwardly inclined feed-board arranged between each two adjacent concave-sections and temporarily supporting the material clear of the teeth of the threshing-cylinder, substantially as set forth.

4. In a threshing-machine, the combination, with a threshing-cylinder, and a rotary blower; of a driving-shaft, a counter-shaft, driving devices connecting the counter-shaft with the cylinder, changeable driving mechanism connecting the said driving-shaft with the counter-shaft or direct with the cylinder-shaft so that the cylinder may be driven at two different speeds, and driving devices operatively connecting the blower with the driving-shaft and operating to revolve the blower at the same ratio of speed as the driving-shaft irrespective of the speed imparted to the cylinder, substantially as set forth.

5. In a threshing-machine, the combination, with a threshing-cylinder, and a rotary blower; of a driving-shaft and a counter-shaft, the said driving-shaft being arranged equidistant from the cylinder-shaft and counter-shaft, a toothed driving-wheel secured on the said driving-shaft, driving devices connecting the counter-shaft with the cylinder, a toothed pinion slidable on the cylinder-shaft and counter-shaft and adapted to connect each of them with the said driving-wheel so that the cylinder may be driven at two different speeds, and driving devices operatively connecting the blower with the driving-shaft and operating to revolve the blower at the same ratio of speed as the driving-shaft irrespective of the speed imparted to the cylinder, substantially as set forth.

6. In a threshing-cylinder, the combination, with a shaft, and heads secured on it; of bars extending between the said heads, a series of toothed rings provided with holes and slid upon the said bars, said rings being supported by the bars clear of the said shaft, and distance-pieces between the said rings, substantially as set forth.

7. In a threshing-machine, the combination, with a supporting-plate provided with an opening, of a cylindrical screen provided at one end with an annular head having a beveled edge, a flanged ring secured against the said head and forming a V-shaped groove with its said edge, brackets secured to the said plate and engaging with the flange of the said ring, and a cord engaging with the said groove and operating to revolve the screen, substantially as set forth.

8. In a threshing-machine, the combination, with a threshing-cylinder, and a feed-chute arranged above and behind the cylinder; of revoluble and stationary concave-sections arranged around the said cylinder, driving mechanism operating to revolve the revoluble concave-sections continuously, and a downwardly and rearwardly inclined feed-board arranged between each two adjacent concave-sections and temporarily supporting the material clear of the teeth of the threshing-cylinder, substantially as set forth.

9. In a threshing-machine, the combination, with a toothed cylinder, of concave-sections arranged around the said cylinder and provided with threshing-teeth, and closed chambers provided at their lower parts with inclined feed-boards and interposed between each pair of concave-sections, the material being temporarily brought to rest in each of said chambers and then fed onward to the next concave-section by gravity, substantially as set forth.

In testimony whereof I affix my signature in presence of two witnesses.

JOHN H. GARDNER.

Witnesses:
JOHN A. WILLIAMS,
T. J. WOFFORD.